(12) United States Patent
Gharda

(10) Patent No.: US 9,896,775 B2
(45) Date of Patent: Feb. 20, 2018

(54) PROCESS FOR MANUFACTURING ALUMINUM FROM BAUXITE OR ITS RESIDUE

(71) Applicant: Keki Hormusji Gharda, Bandra (West) Mumbai (IN)

(72) Inventor: Keki Hormusji Gharda, Bandra (West) Mumbai (IN)

(*) Notice: Subject to any disclaimer, the term of this patent is extended or adjusted under 35 U.S.C. 154(b) by 376 days.

(21) Appl. No.: 14/370,354

(22) PCT Filed: Jan. 1, 2013

(86) PCT No.: PCT/IN2013/000001
§ 371 (c)(1),
(2) Date: Jul. 2, 2014

(87) PCT Pub. No.: WO2013/114391
PCT Pub. Date: Aug. 8, 2013

(65) Prior Publication Data
US 2015/0027902 A1    Jan. 29, 2015

(30) Foreign Application Priority Data

Jan. 4, 2012 (IN) .............................. 26/MUM/2012

(51) Int. Cl.
| | | |
|---|---|---|
| C25C 3/06 | (2006.01) |
| C25C 3/08 | (2006.01) |
| C25C 3/00 | (2006.01) |
| C25C 1/22 | (2006.01) |
| C22B 21/00 | (2006.01) |
| C01F 7/60 | (2006.01) |
| C01G 23/02 | (2006.01) |
| C01G 49/10 | (2006.01) |
| C25C 3/18 | (2006.01) |
| C22B 34/12 | (2006.01) |

(52) U.S. Cl.
CPC .................. *C25C 1/22* (2013.01); *C01F 7/60* (2013.01); *C01G 23/02* (2013.01); *C01G 49/10* (2013.01); *C22B 21/0007* (2013.01); *C22B 34/1231* (2013.01); *C25C 3/06* (2013.01); *C25C 3/18* (2013.01); *C01P 2006/80* (2013.01); *Y02P 10/212* (2015.11)

(58) Field of Classification Search
CPC .... C25C 3/06; C25C 3/08; C25C 3/00; C22B 21/0053
USPC ......................................................... 205/372
See application file for complete search history.

(56) References Cited

U.S. PATENT DOCUMENTS

| | | |
|---|---|---|
| 3,725,222 A | 4/1973 | Russell et al. |
| 3,785,941 A | 1/1974 | Jacobs |
| 4,039,648 A | 8/1977 | Haupin et al. |
| 4,083,927 A | 4/1978 | Wyndham |
| 4,151,061 A | 4/1979 | Ishikawa et al. |
| 4,252,774 A | 2/1981 | Loutfy et al. |
| 4,308,113 A | 12/1981 | Das |
| 4,363,789 A | 12/1982 | Dunn, Jr. |
| 4,396,482 A | 8/1983 | Das et al. |
| 6,402,910 B1 | 6/2002 | Putter et al. |
| 6,808,695 B1 | 10/2004 | Chaplin |

FOREIGN PATENT DOCUMENTS

| | | |
|---|---|---|
| CN | 1083873 | 3/1994 |
| GB | 1136608 | 12/1968 |
| WO | 83/01612 | 5/1983 |

OTHER PUBLICATIONS

International Search Report issued in corresponding International Application No. PCT/IN2013/000001 dated Sep. 5, 2013.

*Primary Examiner* — Zulmariam Mendez
(74) *Attorney, Agent, or Firm* — Whiteford, Taylor & Preston, LLP; Peter J. Davis

(57) ABSTRACT

The present disclosure related to an economic and environmental safe process for obtaining one or more metals from the red mud slag, bauxite, karst bauxite, lateritic bauxite, clay and the like. The present disclosure also related to a process for obtaining elemental aluminum by electrolyzing $AlCl_3$ in the electrolysis cell.

13 Claims, No Drawings

PROCESS FOR MANUFACTURING ALUMINUM FROM BAUXITE OR ITS RESIDUE

CROSS REFERENCE TO RELATED APPLICATIONS

This application is a National Stage Entry of PCT/IN2013/000001, filed Jan. 1, 2013, which claims priority to Indian Patent Application No. 26/MUM/2012, filed Jan. 4, 2012, the specification of which is incorporated herein by reference in its entirety.

FIELD OF DISCLOSURE

The present disclosure relates to a process for obtaining a metal from ore. The present disclosure particularly relates to a process for obtaining aluminum from bauxite ore, its residue and clay.

BACKGROUND

Aluminum is a light weight, high strength and recyclable structural metal. It plays an important role in social progress and has a pivotal contribution in transportation, food and beverage packaging, infrastructure, building and construction, electronics and electrification, aerospace and defense. Therefore, the demand of aluminum is likely to increase with the growth rate of 4.1% per year.

The commercially mined aluminum ore is bauxite, it has the highest content of alumina along with mineral oxides of silica, iron, titanium, calcium, vanadium, manganese and other impurities in minor or trace amount.

The production of elemental aluminum from aluminum ore is basically an electrochemical process. It involves first chemical separation of alumina (aluminum oxide) from undesired components like oxides of iron, titanium, silica, calcium, vanadium, manganese etc. in bauxite and then electrolysis of alumina to obtain elemental aluminum.

The chemical separation of alumina generates enormous amounts of red mud waste or bauxite residue which is posing a very serious and alarming environmental problem. The electrolysis step in the production of aluminum uses aluminum fluoride and carbon anodes which lead to emission of perfluorocarbon gases (PFCs) and carbon dioxide respectively. Furthermore electrolysis of alumina requires large amount of electricity which expends over 12 KWh/Kg. Further there is consumption of the costly anode at a rate of about 0.4 ton/ton of aluminum. Therefore, the production of aluminum is expensive.

Several efforts have been made in the past to overcome one or more of the afore-mentioned drawbacks. Some of the examples of typical prior art processes for the manufacture of aluminum are disclosed herein below.

U.S. Pat. No. 4,308,113 discloses a process for manufacturing aluminum by using a modified graphite electrodes with reduced wear rates, wherein the modified graphite electrodes are prepared by titanium and/or aluminum compounds. These electrodes are used to control the ash content and also to decrease the cathode electrode wear in the electrolytic cell.

U.S. Pat. No. 4,396,482 discloses an electrolytic cell for production of metal such as aluminum. The composite cathode of the electrolytic cell comprises a base cathode and cathode extension surfaces made up of graphite and at least 90% refractory hard metal such as titanium diboride and a carbonaceous binder material.

U.S. Pat. No. 4,151,061 discloses a sealed-type electrolytic cell. This cell comprises aluminum chloride feeding port and chlorine gas discharging ports in a top section and a molten metal reservoir in a bottom section.

U.S. Pat. No. 3,725,222 discloses a continuous process for the production aluminum by electrolysis of aluminum chloride. In electrolysis cell used in said process contains aluminum chloride, dissolved in a molten solvent having a higher electro-decomposition potential than aluminum chloride.

U.S. Pat. No. 3,785,941 electrolytic cell for the production of aluminum by electrolysis of aluminum chloride is disclosed. The cell comprises an electrolytic chamber for holding a bath of molten metal chloride-based electrolyte, wherein the chamber has a non-conducting interfacial bounding for the bath or vapors and gases emanated from the bath. The non-conducting bounding is formed of a refractory material consisting essentially of nitride and/or oxide of silicon, boron or aluminum.

U.S. Pat. No. 4,252,774 is another prior art which discloses a method of manufacturing aluminum chloride from aluminous materials containing compounds of iron, titanium and silicon is disclosed. The method comprises reacting the aluminous materials with carbon and a chlorine-containing gas at a temperature of about 900° K to form a gaseous mixture, wherein the heated gases are passed in intimate contact with aluminium sulphide to precipitate out solid iron sulphide and form additional gaseous aluminium chloride and separating the gaseous aluminium chloride from the solid iron sulphide.

U.S. Pat. No. 4,039,648 is yet another prior art which discloses a method for manufacturing aluminum chloride by contacting $Al_2O_3$ with a reducing agent and chlorine in a bath of molten metal halides to form aluminum chloride and recovering the aluminum chloride by vaporization is disclosed.

Therefore inventors of the present disclosure envisaged a simple and economic process for obtaining metals from aluminum ore.

OBJECTS

Some of the objects of the present disclosure are as follows:

It is an object of the present disclosure to provide a simple and economic process for obtaining metals from the aluminum ore and bauxite residue.

It is another object of the present invention is to provide a two-stage process for carbochlorination of bauxite and/or red mud slag to recover metal values such as aluminum, iron and titanium.

It is still another object of the present disclosure to provide a process for obtaining metals from the aluminum ore and bauxite residue which reduces emission of carbon dioxide and perfluorocarbon gases (PFCs).

It is yet another object of the present disclosure to provide a process for obtaining metals from the aluminum ore and bauxite residue which is energy efficient and operates at moderate temperature.

It is further object of the present disclosure to provide a process for obtaining metals from the aluminum ore or bauxite residue which reduces oxidation and intercalation of electrodes of electrolysis cell.

DEFINITIONS

Sublime compound: It is a compound which gets volatilized from the solid state to a gas or vapor.

Other objects and advantages of the present disclosure will be more apparent from the following description, which are not intended to limit the scope of the present invention.

SUMMARY

In accordance with one aspect of the present disclosure there is provided a process for obtaining at least one metal from a mixture comprising an aluminum compound and optionally, at least one compound selected from the group consisting of an iron compound and a titanium compound; said process comprising the following steps;
   a. pulverizing the mixture to obtain a powder and calcining said powder at a temperature ranging between 600° C. and 800° C. to obtain a calcined feed containing aluminum oxide and optionally, at least one oxide selected from the group consisting of titanium oxide and iron oxide;
   b. mixing the calcined feed with a carbonaceous material to obtain a blend; carbochlorinating the blend by using a stream of chlorine gas at a temperature ranging between 600° C. and 1000° C., to obtain a gaseous stream containing aluminum chloride and optionally, at least one chloride selected from the group consisting of iron (III) chloride and titanium chloride;
   c. condensing the gaseous stream to obtain a chloride condensate containing aluminum chloride constituent and optionally, at least one chloride selected from the group consisting of iron (III) chloride constituent and titanium chloride constituent;
   d. optionally, treating the chloride condensate to fractionally separate the aluminum chloride constituent and optionally at least one chloride constituent selected from the group consisting of iron (III) chloride constituent and titanium chloride constituent; and
   e. electrolyzing the aluminum chloride constituent in an electrolysis cell to obtain aluminum metal.

Typically, the calcined feed contains aluminum oxide, iron oxide and optionally titanium oxide, the step of cabochlorinating the blend comprises the following two steps;
   a. carbochlorinating the blend at a temperature ranging between 550° C. to 900° C. to selectively, separate iron chloride in gaseous form and a second mixture containing aluminum oxide and optionally, titanium oxide; and
   b. oxidizing the iron chloride by using the oxidizing agent to separate iron in the form of iron oxide and subsequently recovering chlorine;

Typically, the chloride condensate comprises aluminum chloride constituent, iron (III) chloride constituent and titanium chloride constituent and the step of separating the chloride condensate into its constituent includes the step of heating the chloride condensate at a temperature ranging between 140° C. and 160° C. to sublime the titanium chloride constituent and obtain a first mixture containing aluminum chloride constituent and ferric chloride constituent; and subsequently, heating the first mixture in a vaporizer seeded with a reducing agent to reduce iron (III) chloride constituent into at least one form selected from the group consisting of ferrous chloride and iron and collect the aluminum chloride constituent; wherein the vaporizer is maintained at a temperature ranging between 185° C. and 350° C.

Typically, the chloride condensate comprises aluminum chloride constituent and iron (III) chloride constituent and the step of separating the chloride condensate into its constituent includes the step of heating the chloride condensate in a vaporizer seeded with a reducing agent to reduce iron (III) chloride constituent to ferrous chloride constituent and collect the aluminum chloride constituent; wherein the vaporizer is maintained at a temperature ranging between 185° C. and 350° C.

Typically, the chloride condensate comprises aluminum chloride constituent and titanium chloride constituent and the step of separating the chloride condensate into its constituent includes the step of heating the chloride condensate at a temperature ranging between 140° C. and 160° C. to sublime the titanium chloride constituent and collect the aluminum chloride constituent.

Typically, the mixture comprising aluminum compound is at least one selected from the group consisting of red mud slag, bauxite, karst bauxite, lateritic bauxite and clay.

Typically, the amount of calcined feed and carbonaceous matter ranges between 4:1 and 10:1.

Typically, the carbonaceous matter is at least one selected from the group comprising of char, petroleum coke, coal pyrolysis char, charcoal, carbon monoxide and carbon black.

The process as claimed in claim 1, wherein the stream of chlorine gas is maintained at a temperature ranging between 600° C. and 900° C.

Typically, the electrolysis cell comprises electrodes and molten electrolyte of alkali chloride and is maintained at a temperature ranging between 600° C. and 800° C.

Typically, the alkali chloride is at least one selected from the group comprising sodium chloride, potassium chloride, lithium chloride and aluminum chloride.

Typically, oxidizing agent is at least one selected from the group comprising of oxygen, air and oxygen enriched air.

Typically, the reducing agent is at least one metal salt in tetrachloroaluminate.

Typically, the metal salt is at least one salt selected from the group comprising of salts of lithium, sodium, magnesium, iron, zinc, calcium, aluminum and potassium.

Typically, the amount of the aluminum chloride constituent fed to electrolysis cell ranges between 2% and 10% with respect to the total mass of the electrolyte.

Typically, the electrolysis cell is maintained at a cathode anode distance of 1 to 1.5 cm and single cell voltage ranging between 2.7V and 2.8V; at a temperature ranging between 600° C. and 850° C.; at a pressure ranging between 1.0 kg/cm2 and 2.5 kg/cm2; and at a current density ranging between 0.1 A/Dm2 and 100 A/Dm2.

DETAILED DESCRIPTION

The present disclosure envisaged a process for obtaining metals such as aluminum, iron and titanium from a mixture. The mixture used for obtaining a metal includes red mud, smelting slag, bauxite, karst bauxite, lateritic bauxite, clays and combinations thereof. These mixtures are typically characterized by presence of an aluminum compound. These mixtures further may or may not contain iron and titanium compound.

In the first step, the mixture is pulverized to obtain a powder having fine grained particles of below 74 micron and then it is heated at a temperature ranging between 600° C. and 800° C. to obtain a calcined feed. The calcined feed is then mixed with carbonaceous material in an amount ranging between 4:1 and 10:1 to obtain a blend.

In one embodiment of the present disclosure the calcined feed contains only aluminum oxide.

In another embodiment of the present disclosure the calcined feed contains aluminum oxide, titanium oxide and iron oxide.

In yet another embodiment of the present disclosure the calcined feed contains aluminum oxide with titanium oxide or iron oxide.

The carbonaceous material used in the present disclosure includes but is not limited to char, petroleum coke, coal pyrolysis char, charcoal, carbon monoxide and carbon black.

The blend containing aluminum oxide is further carbochlorinated in presence of stream of chlorine gas to obtain a gaseous stream containing aluminum chloride. If the blend further contains iron oxide and/or titanium oxide then the gaseous stream also contains chlorides of titanium and/or iron along with aluminum chloride as iron oxide and/or titanium oxide gets converted to their respective chlorides during the carbochlorination reaction. The stream of chlorine gas is maintained at a temperature ranging between 600° C. and 900° C. to convert aluminum oxide, titanium oxide and iron oxide into their respective chlorides.

In one embodiment of the present disclosure the blend is carbochlorinated in a carbochlorination reactor.

In another embodiment of the present disclosure the blend is carbochlorinated by using chlorine gas in a two-stage fluidized bed reactor. The first stage carbochlorination process is carried out at a temperature range of 550° C. to 900° C. to selectively obtain iron (III) chloride in gaseous form. The iron (III) chloride so obtained is oxidized by using one or more oxidizing agent which includes but is not limited to oxygen, air and oxygen enriched air to separate the iron in the form of iron oxides and recover the chlorine. The recovered chlorine is again fed to the second stage of the carbochlorination process at a temperature in the range of 600 to 1000° C. to selectively obtain gaseous stream containing aluminum chloride and titanium chloride.

In one embodiment, the recovered chlorine is used in next iteration of first stage of carboclorination.

In accordance with the present disclosure, the calcined feed and the carbonaceous matter are either mixed before adding it to the reactor or it is fed separately to the reactor and then mixed to obtain the blend.

In the second step, the gaseous stream is condensed in surface condensers and/or contact condensers to obtain chloride condensate. In one of the exemplary embodiment of the present disclosure, the chloride condensate contains any one or more constituents from among aluminum chloride, titanium chloride and iron (III) chloride.

In still another exemplary embodiment of the present disclosure the chloride condensate contains aluminum chloride constituent and titanium chloride constituent.

In yet another exemplary embodiment of the present disclosure the chloride condensate contains aluminum chloride constituent and iron (III) chloride constituent.

In accordance with one of the aspect of the present disclosure, the chloride condensate containing aluminum chloride constituent is fed directly to the electrolysis cell to obtain aluminum metal.

In accordance with another aspect of the present disclosure, the chloride condensate containing aluminum chloride constituent, titanium chloride constituent and/or iron (III) chloride constituent is fractionally separated to obtain their respective chloride constituent.

In one of the exemplary embodiment of the present disclosure the chloride condensate contains aluminum chloride constituent and titanium chloride constituent which is filtered and/or centrifuged. Thereafter, the chloride condensate/filter cake/centrifuge cake is heated at a temperature in the range of 140° C. to 160° C. to sublime titanium chloride constituent from aluminum chloride constituent.

In another exemplary embodiment of the present disclosure the chloride condensate contains aluminum chloride constituent and iron (III) chloride constituent. Therefore, the chloride condensate is fed to a vaporizer/reducer to separate iron (III) chloride constituent in the form of ferrous chloride and/or iron and subsequently separate the aluminum chloride constituent.

In yet another exemplary embodiment of the present disclosure the chloride condensate contains aluminum chloride constituent, titanium chloride constituent and iron (III) chloride constituent. Therefore, the chloride condensate is first heated at a temperature in the range of 140° C. to 160° C. to sublime titanium chloride constituent and then feeding remaining aluminum chloride constituent and iron (III) chloride constituent to a vaporizer/reducer to separate iron (III) chloride in the form of ferrous chloride and/or iron and subsequently collect the aluminum chloride constituent.

The vaporizer/reducer used to fractionate iron (III) chloride constituent from aluminum chloride constituent comprises molten mass of metal salts in tetrahaloaluminate to reduce iron (III) chloride constituent into ferrous chloride and/or iron using reducing metal. The metal includes but is not limited to lithium, sodium, magnesium, iron, zinc, calcium, aluminum and potassium and the vaporizer is maintained at a temperature ranging between 185° C. and 350° C.

The tetrahaloaluminate used in the present disclosure is tetrachloroaluminate.

In another embodiment of the present disclosure the tetrachloroaluminate contains molten mass of sodium salt and potassium salt.

In the third step, the aluminum chloride constituent is fed to an electrolysis cell in an amount ranging between 2% and 5% with respect to the total mass of the electrolyte to obtain aluminum metal.

The chlorine gas separated in the electrolysis cell is recycled to the iteration of carbochlorination process. Alternatively, the recovered chlorine gas is stored in compressed or liquefied form.

In another exemplary embodiment of the present disclosure the aluminum (Al) metal produced in the electrolysis cell is removed periodically. Iron from the vaporizer is filtered and separated by a magnetic separation.

The electrolysis cell disclosed in the present disclosure comprises electrodes dipped into the molten electrolyte of alkali metal chlorides and it is maintained at a temperature ranging between 600° C. and 750° C., at a single cell voltage ranging between 2.7 V and 2.8 V; and at a pressure ranging between 1.0 kg/cm$^2$ and 2.5 kg/cm$^2$.

In the electrolysis process, aluminum chloride requires much less energy for dissociation compared to the conventionally used aluminum oxide ($Al_2O_3$). However, use of $AlCl_3$ in the electrolysis process to obtain elemental aluminum is currently limited due to the associated corrosion problems and high maintenance costs due to the higher operation temperatures. Aluminum chloride though sublimable and non-conducting by nature, at operating temperatures in the range of 600° C. to 850° C. and at a single cell voltage of 2.7 V to 2.8 V it becomes less volatile and highly conducting by forming low volatile compound salts with alkali metal salts.

The alkali chloride used in electrolysis cell includes but is not limited to sodium chloride, potassium chloride, lithium chloride and the like.

The anodes used in the electrolysis process are selected from impure aluminum, carbon, graphite, silicon carbide, and any composite or lined material thereof, preferably carbon anodes preferably from renewable sources. Alternately, conventional carbon cathodes are used in the electrolysis process. Alternatively, carbon electrodes are used as bipolar electrodes.

The current density is maintained between 0.1 Amp/DM$^2$ to 100 Amp/DM$^2$ and the distance between the anode and the cathode is from 1 cm to 10 cm.

The carbochlorination reactor as well as electrolysis cell is lined with 70-90% $Al_2O_3$ bricks surrounded by insulation bricks.

The present disclosure is further described in light of the following examples which are set forth for illustration purpose only and not to be construed for limiting the scope of the disclosure.

EXAMPLE 1

1000 gm of raw bauxite was pulverized to fine grained particles of below 74 micron (passing 200 mesh) and was heated at a temperature of 700° C. to obtain calcined bauxite. The major components of the calcined bauxite was 65 wt % of Aluminum oxide, 20 wt % of iron oxide, 5.5 wt % of Titanium dioxide and 6.5 wt % of Silicon dioxide along with other minor oxides. The calcined bauxite was then mixed with 250 g of fine char powder and was taken in a quartz reactor with gas distributor. The mixture was reacted with a stream of chlorine gas at flow rate of 50 lit/hr. and at a temperature of 850° C. in fluidized condition to obtain gaseous stream containing mixture of aluminum chloride, iron (III) chloride and titanium chloride. The gaseous stream was passed through series of partial condensers. The main products aluminum chloride and titanium chloride were condensed and collected in their respective condensers. The main impurity in both the products was iron (III) chloride with other minor impurities and the products were subjected to purification prior to electrolysis.

The aluminum chloride produced in the above carbochlorination stage contains 5 wt % of iron (III) chloride, 0.1 wt % of titanium chloride and 0.2% of other oxides. The solid aluminum chloride was fed into a vaporizer containing molten metal salt in tetra chloroaluminate at a temperature of 250° C. and at flow rate of 600 g/h rate for 5 hr. The vaporization of aluminum chloride was carried out under reductive condition by adding aluminum powder at a flow rate of 25 g/hour with stirring to reduce the iron (III) chloride to high boiling lower chloride ferrous chloride. The pure aluminum chloride vapor was directly fed to electrolysis cell. The iron (III) chloride content in the purified aluminum chloride vapor was less than 0.05 wt % and it was free from titanium chloride and oxide impurities. The iron, lower chloride and oxide impurities were drained from the vaporizer periodically and processed separately for valuable products.

The aluminum chloride vapor was directly fed to electrolysis cell containing a molten electrolyte of alkali and alkaline earth chlorides at a temperature of 700° C. The cell was lined with impervious high alumina (98.2 wt %) refractory bricks. The composition of the base electrolyte was 48.5 mol % of sodium chloride, 48.5 mol % of potassium chloride and 3 mol % of calcium chloride. The concentration of aluminum chloride of the electrolysis bath was maintained in the range of 2 to 5 wt % of the electrolyte during electrolysis. Electrolysis was carried out in bipolar electrode arrangements with a carbon cathode, a central bipolar electrode (also Carbon) and a graphite anode with active electrode area of 225 cm$^2$ (15 cm×15 cm) at an inter electrode distance of 1.2 cm. Electrolysis was carried out by passing 180 Ampere DC current at 0.8 A/cm2 current density for 5 h. The total cell voltage of the bipolar cell was 5.6 V with an average individual cell voltage of 2.8 V. The molten aluminium metal was allowed to accumulate in a pit provided in the cell and the C12 gas scrubbed in NaOH scrubber. At the end of electrolysis 583 g of aluminium metal was tapped out from the cell. The current efficiency of the cell was at 97% in this 5 hrs of operation.

EXAMPLE 2

600 gm of slag from bauxite residue after smelting and removal of most of the iron was pulverized to fine grained particles of below 74 micron (passing 200 mesh). The major components of the slag was 45 wt % of aluminum oxide, 8 wt % of iron oxide, 15 wt % of titanium dioxide and 19.5 wt % of silicon dioxide and 6% Carbon along with other minor oxides. The slag was then mixed with 120 g of fine char powder and was taken in a quartz reactor with gas distributor. The mixture was reacted with a stream of chlorine gas at flow rate of 30 lit/hr. and at a temperature of 880° C. in fluidized condition to obtain gaseous stream containing mixture of aluminum chloride, iron (III) chloride and titanium chloride. The gaseous stream was passed through series of partial condensers. The main products iron (III) chloride, aluminum chloride and titanium chloride were condensed and collected in their respective condensers. The main impurity in the aluminum and titanium chlorides was iron (III) chloride with other minor impurities and the products were subjected to purification prior to electrolysis.

The aluminum chloride produced in the above carbochlorination stage contains 1.5 wt % of iron (III) chloride, 0.5 wt % of titanium chloride and 0.25% of other oxides. The solid aluminum chloride was fed into a vaporizer containing molten metal salt in tetra chloroaluminate at a temperature of 250° C. and at flow rate of 750 g/h rate for 20 hrs. The vaporization of aluminum chloride was carried out under reductive condition by adding aluminum powder at a flow rate of 20 g/hour with stirring to reduce the iron (III) chloride to mostly iron powder and some high boiling lower chloride ferrous chloride. The pure aluminum chloride vapor was directly fed to electrolysis cell. The iron (III) chloride content in the purified aluminum chloride vapor was less than 0.02 wt % and it was free from titanium chloride and oxide impurities. The iron, lower chloride and oxide impurities were drained from the vaporizer periodically and processed separately for valuable products.

The aluminum chloride vapor was directly fed to electrolysis cell containing a molten electrolyte of alkali and alkaline earth chlorides at a temperature of 700° C. The cell was lined with impervious high alumina (98.2 wt %) refractory bricks. The composition of the base electrolyte was 48.5 mol % of sodium chloride, 48.5 mol % of potassium chloride and 2 mol % of calcium chloride. The concentration of aluminum chloride in the electrolysis bath was maintained in the range of 2 to 5 wt % of the electrolyte during electrolysis. Electrolysis was carried out in bipolar electrode arrangements with a carbon cathode, a central bipolar electrode (also Carbon) and a graphite anode with active electrode area of 225 cm$^2$ (15 cm×15 cm) at an inter electrode distance of 1.2 cm. Electrolysis was carried out by passing 225 Ampere DC current at 1 A/cm$^2$ current density for 20 h. The total cell voltage of the bipolar cell was 5.8 V with an average individual cell voltage of 2.9 V. The molten aluminium metal was allowed to accumulate in a pit provided in the cell and the C12 gas scrubbed in NaOH scrubber. At the end of electrolysis 2892 g of aluminium metal was tapped out from the cell. The current efficiency of the cell was at 96.2% in this 20 hrs. of operation.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

"Whenever a range of values is specified, a value up to 10% below and above the lowest and highest numerical value respectively, of the specified range, is included in the scope of the invention".

While considerable emphasis has been placed herein on the particular features of this invention, it will be appreciated that various modifications can be made, and that many changes can be made in the preferred embodiments without departing from the principle of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

The invention claimed is:

1. A process for obtaining at least one metal from a mixture comprising an aluminum compound and at least one compound selected from the group consisting of an iron compound and a titanium compound; said process comprising the following steps:
    a. pulverizing the mixture to obtain a powder having particles of below 74 micron and calcining said powder at a temperature ranging between 600° C. and 800° C. to obtain a calcined feed containing aluminum oxide and at least one oxide selected from the group consisting of titanium oxide and iron oxide;
    b. mixing the calcined feed with a carbonaceous material to obtain a blend; carbochlorinating the blend by using a stream of chlorine gas at a temperature ranging between 600° C. and 1000° C., to obtain a gaseous stream containing aluminum chloride and at least one chloride selected from the group consisting of iron (III) chloride and titanium chloride;
        wherein the amount of calcined feed and carbonaceous matter ranges between 4:1 and 10:1
    c. condensing the gaseous stream to obtain a chloride condensate containing aluminum chloride constituent and at least one chloride selected from the group consisting of iron (III) chloride constituent and titanium chloride constituent;
    d. treating the chloride condensate to separate the chloride condensate into its constituent includes the step of heating the chloride condensate at a temperature ranging between 140° C. and 160° C. to vaporize the titanium chloride constituent and obtain a first mixture containing aluminum chloride constituent and ferric chloride constituent; and subsequently, heating the first mixture in a vaporizer seeded with a reducing agent selected from at least one metal salt in tetrachloroaluminate to reduce iron (III) chloride constituent into at least one form selected from the group consisting of ferrous chloride and iron and collect the aluminum chloride constituent; wherein the vaporizer is maintained at a temperature ranging between 185° C. and 350° C., to fractionally separate the aluminum chloride constituent and optionally at least one chloride constituent selected from the group consisting of iron (III) chloride constituent and titanium chloride constituent; and
    e. electrolyzing the aluminum chloride constituent in an electrolysis cell to obtain aluminum metal.

2. The process as claimed in claim 1, wherein the calcined feed contains aluminum oxide, iron oxide and optionally titanium oxide, the step of carbochlorinating the blend comprises the following two stages;
    a. carbochlorinating the blend at a temperature ranging between 550° C. to 900° C. to selectively, separate iron chloride in gaseous form and a second mixture containing aluminum oxide and optionally, titanium oxide; and
    b. oxidizing the iron chloride by using the oxidizing agent to separate iron in the form of iron oxide and subsequently recovering and recycling chlorine.

3. The process as claimed in claim 1, wherein the chloride condensate comprises aluminum chloride constituent and iron (III) chloride constituent and the step of separating the chloride condensate into its constituent includes the step of heating the chloride condensate in a vaporizer seeded with a reducing agent to reduce iron (III) chloride constituent to ferrous chloride constituent and collect the aluminum chloride constituent; wherein the vaporizer is maintained at a temperature ranging between 185° C. and 350° C.

4. The process as claimed in claim 1, wherein the chloride condensate comprises aluminum chloride constituent and titanium chloride constituent and the step of separating the chloride condensate into its constituent includes the step of heating the chloride condensate at a temperature ranging between 140° C. and 160° C. to sublime the titanium chloride constituent and collect the aluminum chloride constituent.

5. The process as claimed in claim 1, wherein the mixture comprising aluminum compound is at least one selected from the group consisting of red mud slag, bauxite, karst bauxite, lateritic bauxite and clay.

6. The process as claimed in claim 1, wherein the carbonaceous matter is at least one selected from the group comprising of char, petroleum coke, coal pyrolysis char, charcoal, carbon monoxide and carbon black.

7. The process as claimed in claim 1, wherein the stream of chlorine gas is maintained at a temperature ranging between 600° C. and 900° C.

8. The process as claimed in claim 1, wherein the electrolysis cell comprises electrodes and molten electrolyte of alkali chloride and is maintained at a temperature ranging between 600° C. and 800° C.

9. The process as claimed in claim 8, wherein the alkali chloride is at least one selected from the group comprising sodium chloride, potassium chloride, lithium chloride and aluminum chloride.

10. The process as claimed in claim 2 wherein oxidizing agent is at least one selected from the group comprising of oxygen, air and oxygen enriched air.

11. The process as claimed in claim 1, wherein the at least one metal salt in tetrachloroaluminate is at least one salt selected from the group comprising of salts of lithium, sodium, magnesium, iron, zinc, calcium, aluminum and potassium.

12. The process as claimed in claim 1, wherein the amount of the aluminum chloride constituent fed to electrolysis cell ranges between 2% and 10% with respect to the total mass of the electrolyte.

13. The process as claimed in claim 1, wherein the electrolysis cell is maintained at a cathode anode distance of 1 to 1.5 cm and single cell voltage ranging between 2.7V and 2.8V; at a temperature ranging between 600° C. and 850° C.; at a pressure ranging between 1.0 kg/cm$^2$ and 2.5 kg/cm$^2$; and at a current density ranging between 0.1 A/Dm$^2$ and 100 A/Dm$^2$.

* * * * *